Figures 5, 6:
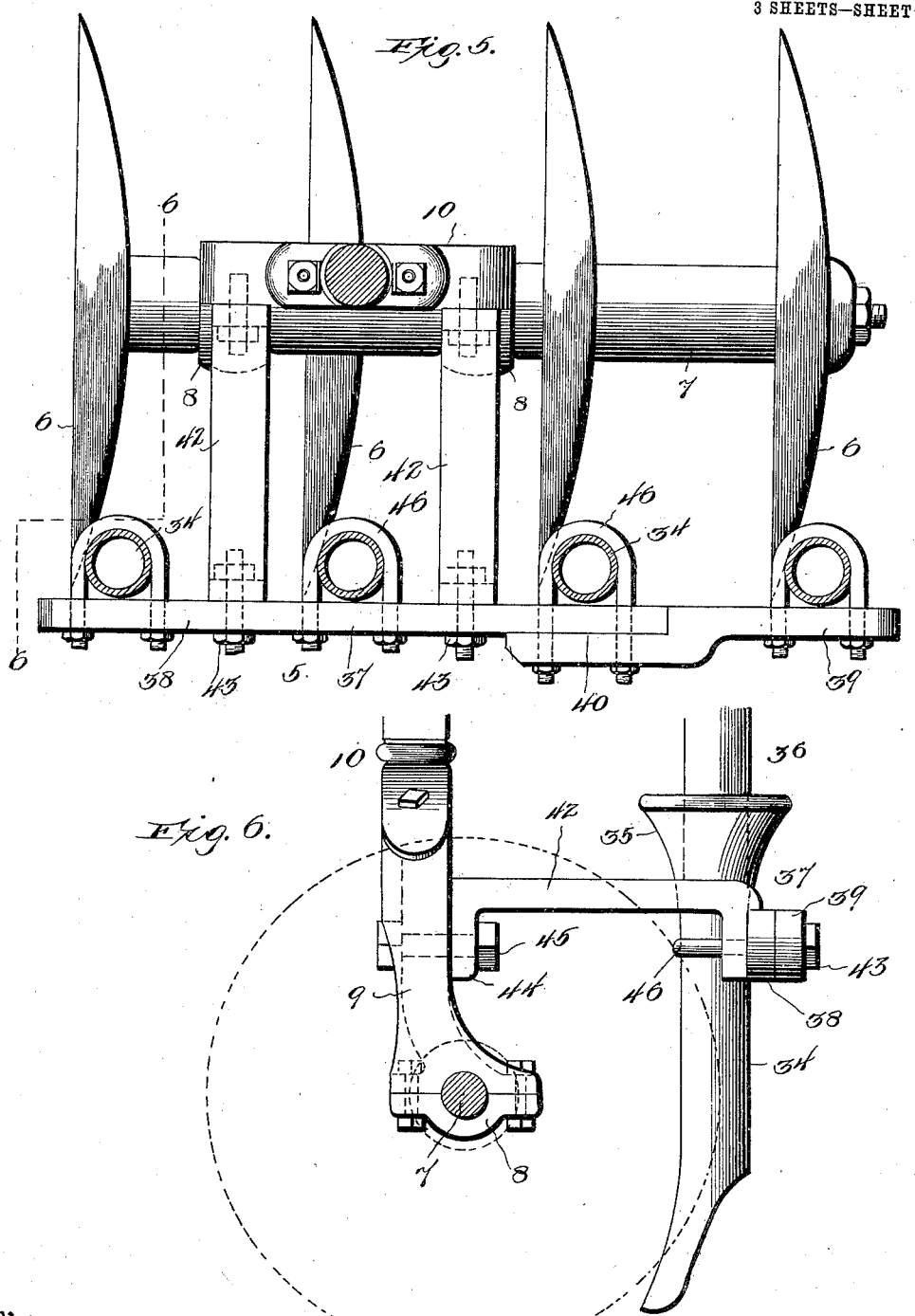

No. 755,523. PATENTED MAR. 22, 1904.
B. MYLOR.
SEED DRILL ATTACHMENT.
APPLICATION FILED JULY 14, 1902.
NO MODEL. 3 SHEETS—SHEET 1.
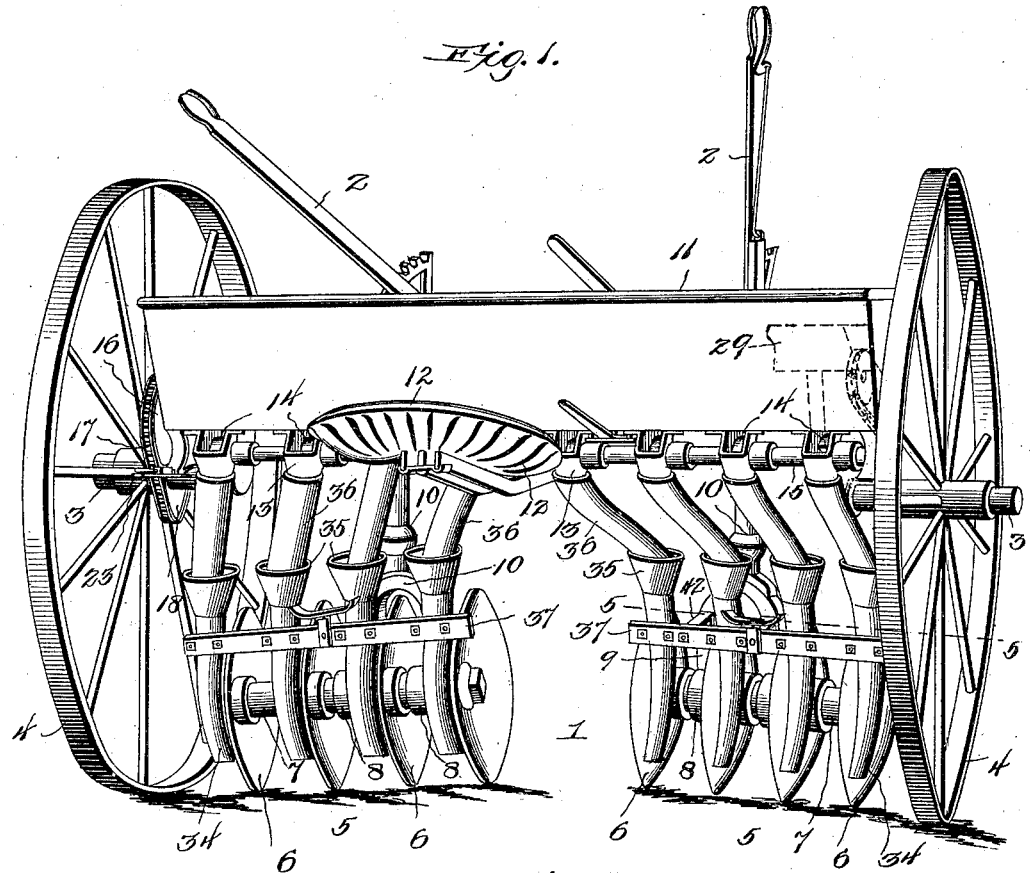
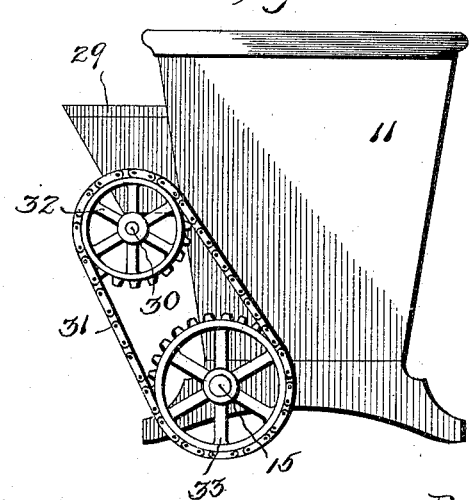
Witnesses
Inventor
Benjamin Mylor,
by
Attorneys No. 755,523. PATENTED MAR. 22, 1904.
B. MYLOR.
SEED DRILL ATTACHMENT.
APPLICATION FILED JULY 14, 1902.
NO MODEL. 3 SHEETS—SHEET 2.
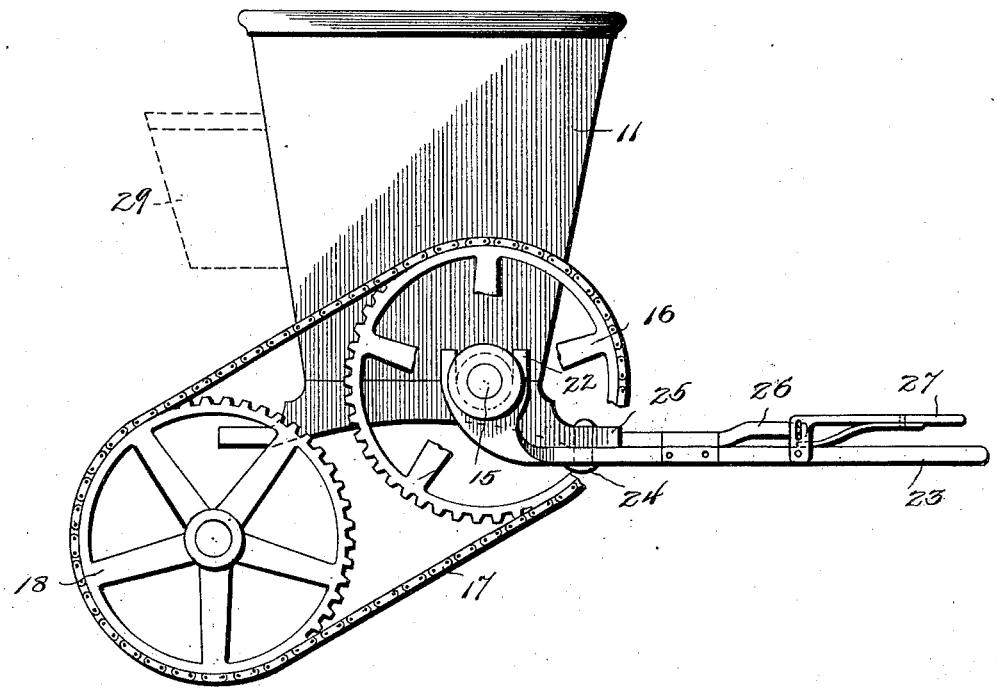
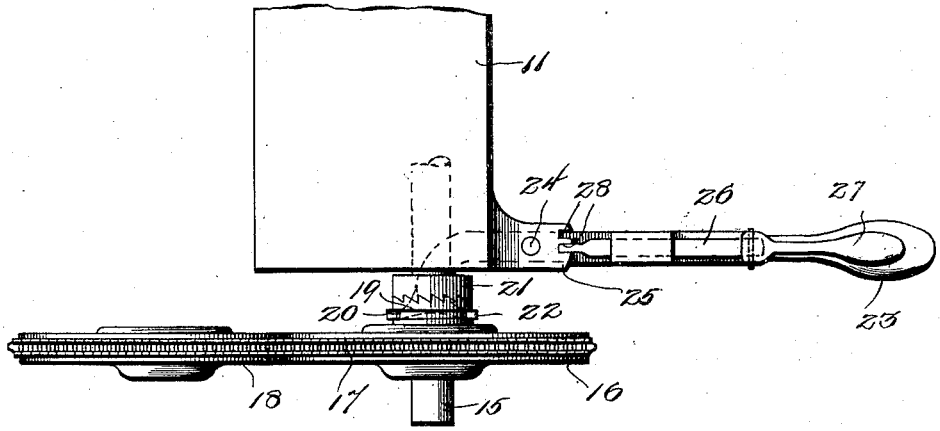
Witnesses
Inventor
Benjamin Mylor,
by
Attorneys No. 755,523. PATENTED MAR. 22, 1904.
B. MYLOR.
SEED DRILL ATTACHMENT.
APPLICATION FILED JULY 14, 1902.
NO MODEL. 3 SHEETS—SHEET 3.

Witnesses
Inventor
Benjamin Mylor
by _____ Attorney

No. 755,523. Patented March 22, 1904.

UNITED STATES PATENT OFFICE.

BENJAMIN MYLOR, OF GEX, KENTUCKY.

SEED-DRILL ATTACHMENT.

SPECIFICATION forming part of Letters Patent No. 755,523, dated March 22, 1904.

Application filed July 14, 1902. Serial No. 115,564. (No model.)

*To all whom it may concern:*

Be it known that I, BENJAMIN MYLOR, a citizen of the United States, residing at Gex, in the county of Gallatin and State of Kentucky, have invented certain new and useful Improvements in Seed-Drill Attachments, of which the following is a specification.

This invention relates to an improved drill attachment designed for application to an ordinary type of disk cultivator, whereby the latter may be converted into a simple and thoroughly effective grain and fertilizer drill.

To this end the invention has primarily in view, associating with a disk cultivator, simple and improved forms of attachment whereby the operation of cultivating or plowing and drilling seed or fertilizer may proceed simultaneously.

Also the invention has in view the provision of positive means, in connection with the attachments, whereby the drilling operation may be checked—that is, the feeding action of the seed or fertilizer stopped, whereby the cultivator parts of the disk cultivator will be left entirely free to be manipulated in the usual manner without reference to the drill attachment.

In carrying out the foregoing objects the invention has specially in view a construction wherein an ordinary disk corn and tobacco cultivator may be adapted for use as a wheat or other grain drill and also adapted for drilling fertilizer along rows of corn or tobacco during the plowing thereof.

With these and many other objects in view, which will more readily appear as the nature of the invention is better understood, the same consists in the novel construction, combination, and arrangements of parts, as will be hereinafter more fully described, illustrated, and claimed.

The essential features of the invention involved is in the manner of mounting and controlling the feeding mechanism and also in the manner of mounting the rigidly-supported drill-tubes in connection with the disks of the separate cultivator-sections are necessarily susceptible to a modification without departing from the spirit of the invention; but a preferred embodiment of the several attachments constituting the invention is shown in the accompanying drawings, in which—

Figure 1 is a rear perspective view of an ordinary disk corn and tobacco cultivator having applied thereto the attachments contemplated by the present invention, thus converting the machine into a grain and fertilizer drill. Fig. 2 is a side view of a portion of the drill-box, exposing the feed-controlling device associated therewith. Fig. 3 is a detail elevation exposing the opposite end of the drill-box, illustrating a supplemental part of the attachment comprising means for operating the grass-seed sower by means of a sprocket-chain instead of by the usual cog-wheels. Fig. 4 is a detail plan view of that portion of the attachment embodying the feed-controlling device for the feed mechanism of the main drill-box. Fig. 5 is a horizontal sectional view on the line 5 5 of Fig. 1, the line of section including one of the cultivator gangs or sections, showing the manner of supporting the gang of drill-tubes in connection therewith; and Fig. 6 is a detail sectional view on the line 6 6 of Fig. 5.

Like reference-numerals designate corresponding parts throughout the several figures of the drawings.

In carrying out the present invention the improvements constituting the attachment are designed to be associated with any ordinary type of disk cultivator, and in effecting this adaptation of a drill attachment to a disk cultivator no special change or alteration of the cultivator is required, nor any interference involved in the manipulation and controlling of the cultivator parts in their usual way when it is preferred to operate the cultivator parts independently of the drill attachment. In this sense the invention is capable of general application to disk cultivators; but as the same possesses special utility in connection with that type of culivators commonly known as "disk," "corn," and "tobacco" cultivators a machine of that type is illustrated in the drawings, to which particular reference will now be made.

As indicated in the drawings, the numeral 1 designates a disk cultivator of the type specified. This cultivator includes in its general organization the usual controlling-levers 2, the short axle-spindles 3, carrying the ground-wheels 4, and the separate oppositely-arranged cultivator-sections 5. The cultivator-sections 5 are usually of duplicate construction and are controlled through the medium of their own controlling devices or levers, and ordinarily in a machine of the type illustrated each cultivator-section usually comprises a plurality or gang of cultivating-disks 6 of the concavo-convex form and arranged in spaced parallel relation upon a rotating axle 7, turning in the spaced horizontally-alined bearings or bearing-boxes 8 at the lower ends of the side arms 9 of the forked carrying-standard 10 of the cultivator. Said carrying-standard 10 of the cultivator constitutes the supporting or carrying element of the gang of disks constituting each section, and said standard is mounted and adjusted in the manner common to machines of the disk cultivator type.

The construction described embodies elements of the disk cultivator with which the several parts of the drill attachment coöperate, and this attachment includes as one of the instrumentalities thereof a main drill-box 11. This main drill-box is rigidly mounted in any suitable and convenient manner upon the upper framework of the cultivator and usually in advance of the driver's seat 12 of the seed-machine. Any suitable type of main drill-box 11 may be employed for holding the seed or fertilizer to be drilled into the ground alongside of the disks 6 of the cultivator; but it is preferable in the carrying out of the invention to employ an ordinary force-feed drill-box embodying as a part thereof the common force-feed mechanism. This force-feed mechanism associated with the main drill-box 11 essentially comprises a plurality of seed-cups 13, associated with bottom discharge-openings in the box and having arranged for movemement therein a feeding-disk or equivalent device 14, mounted upon the main feed-shaft 15, extending longitudinally beneath the main drill-box the full length thereof.

Ordinarily in the operation of a force-feed drill-box the main feed-shaft 15 is driven through the medium of the cog driving-gears; but the present invention contemplates associating with the said feed-shaft a driving device for imparting motion to the feed-shaft through the medium of a sprocket-chain and combining therewith a feed-controlling device whereby the feeding mechanism may be thrown out of action when it is desired to employ the cultivator parts independently.

To secure the results described, the main feed-shaft 15 has mounted on one extremity thereof at one end of the main drill-box a driven sprocket-wheel 16. This driven sprocket-wheel 16 is loosely and slidably mounted on the feed-shaft and receives a driving-chain 17, passing over a sprocket 18, mounted upon the hub of one of the ground-wheels 4 of the cultivator at the inner side of such ground-wheel. The said driven sprocket-wheel 16 is provided at one side thereof with a clutch-hub 19, annularly grooved, as at 20, and having ratchet-teeth coöperating with a clutch-collar 21, fast upon the feed-shaft 15, contiguous to the wheel 16. The annular groove 20 of the clutch-hub 19 receives the shifting fork 22, provided at one end of a feed-controlling lever 23, pivotally mounted, as at 24, upon a holding-bracket 25, projected from a suitable support contiguous to one end of the main drill-box. The said feed-controlling lever 23 projects rearwardly from the main drill-box within convenient reach of the operator and carries thereon a sliding latch 26, operated by a latch-handle 27 and whose inner end coöperates with the locking-notches 28, formed in the holding-bracket 25. When it is desired to throw the feeding mechanism out of action, it is simply necessary to release the latch 26 and swing the controlling-lever 23 in a direction for moving the driven sprocket 16 out of engagement with the clutch-collar 21, thus permitting the said driven sprocket to rotate idly upon the feed-shaft.

To extend the use of the drilling attachment, it is preferred in the carrying out of the invention to have associated with the main drill-box an auxiliary hopper 29, equipped with a suitable feeding-shaft 30 and constituting the ordinary grass-seed sower which is combined with a force-feed drill-box. In the present invention the motion is transferred to the feeding-shaft 30 through the medium of a driving-chain 31, passing over sprocket-wheels 32 and 33, respectively, upon the ends of the shafts 15 and 30.

In conjunction with the plurality or gang of disks 6 of each cultivator-section 5 the present invention contemplates associating therewith a gang of drill-tubes 34. The drill-tubes 34, sometimes termed "hoes" or "shoes," are designed to be arranged alongside of the disks 6 and to extend at their lower ends to a point below the axis of rotation of said disks, so as to provide for properly drilling the seed or fertilizer into the ground. Each of the said drill-tubes 34 is provided at its upper end with a receiving-funnel 35, which loosely receives therein the lower end of a flexible conductor 36, usually made of rubber tubing and having the upper end thereof connected with a seed-cup 13 of one of the individual feeding devices of the feeding mechanism to provide for conducting the seed or fertilizer from such cup into the drill tube or hoe 34, with which it is associated. The flared or funnel-shaped upper end 35 of each drill tube or hoe provides for maintaining a proper operative communication between said tube or hoe and its flexible conductor 36 irrespective of the adjustment of the cultivator-sections.

Each gang or series of the drill tubes or hoes 34 are designed to be carried by a common drill-tube support. This drill-tube support is arranged in rear of the gang or series of disks 6 of each cultivator-section and preferably consists of a sectional supporting-bar 37. As shown in the drawings, the sectional supporting-bar 37 preferably consists of the separate bar-sections 38 and 39, having an overlapping detachable joint 40, which permits of lengthening or swinging the support, according to the number of disks employed in the cultivator-sections. Usually, however, the separate bar-sections are united to constitute a single bar or support for the gang of drill-tubes carried thereby.

The common drill-tube support or supporting-bar 37 is designed to be hung in a permanent relation to the cultivator-sections through the medium of suitable hangers attached directly to the carrying-standard 10 of the cultivator. Usually there are employed a pair of hanger-brackets 42 in connection with each support or supporting-bar 37. The hanger-brackets 42 are arranged in spaced relation and are bolted at their outer ends, as at 43, to the supporting-bar 37. The inner ends of the said hanger-brackets 42 are flanged, as at 44, and bolted, through the medium of the bolts 45, to the side arms 9 of the forked carrying-standard of the cultivator. The said supporting-bar 37 carries a plurality of stirrup-clamp bolts 46, arranged in spaced relation and tightly embracing the individual tubes or hoes 34 to provide for rigidly holding them in positions and maintaining their operative relation alongside of the individual disks 6.

From the foregoing it is thought that the construction, operation, and many advantages of the herein-described attachment will be readily apparent without further description, and it will also be understood that various changes in the form, proportion, and minor details of construction may be resorted to without departing from the spirit of the invention or sacrificing any of the advantages thereof.

Having thus described the invention, what is claimed, and desired to be secured by Letters Patent, is—

1. In an agricultural machine of the class described, the combination with bearing-wheels thereof, of a main drill-box carried by the machine, an auxiliary grass-seed sower carried by the main box, a main feed-shaft extending through the main box, a feed-shaft for the grass-seed sower, a sprocket-chain and clutch connection between one end of the main feed-shaft and the adjacent bearing-wheel, and a sprocket-chain connection between the other end of the main feed-shaft and the grass-seed-sower shaft.

2. In an agricultural machine of the class described, the combination with bearing-wheels, of a main drill-box carried by the machine, a main feed-shaft extending longitudinally of the box and having one end projecting therefrom, said shaft carrying feed devices, a toothed collar fixed upon the projecting end of the feed-shaft, a sprocket-wheel fixed to one of the bearing-wheels, another sprocket-wheel loosely journaled and longitudinally slidable upon the main feed-shaft, said latter wheel having teeth that are movable into and out of engagement with the teeth of the collar, a lever engaging the wheel for moving the same longitudinally, and a sprocket-chain connecting the wheels.

3. In an agricultural machine of the class described, the combination with bearing-wheels and a depending forked standard carrying a gang of disks, of a main drill-box carried by the machine, feeding mechanism driven by one of the bearing-wheels, spaced hangers attached to the forks of the gang-carrying standard and having flanged outer ends, a supporting-bar bolted to the flanges of the hangers, and drill-tubes connected with the drill-box and secured to the supporting-bar.

4. In an agricultural machine of the class described, the combination with bearing-wheels and a depending forked standard carrying a gang of disks, of a main drill-box carried by the machine, feeding mechanism driven by one of the bearing-wheels, spaced hangers attached to the forks of the gang-carrying standard and having flanged outer ends, a supporting-bar comprising sections having their ends overlapped, drill-tubes connected with the drill-box and located transversely of the bar, and clips securing the tubes to the bar, one of said clips passing through the overlapped ends of the sections and constituting means for securing said sections together.

In testimony whereof I affix my signature in presence of two witnesses.

BENJAMIN MYLOR.

Witnesses:
JAMES R. WALLACE,
TOM DEERING.